(12) United States Patent
Ogauchi et al.

(10) Patent No.: US 9,593,749 B2
(45) Date of Patent: Mar. 14, 2017

(54) AUTOMATIC TRANSMISSION

(71) Applicant: MAZDA MOTOR CORPORATION, Hiroshima (JP)

(72) Inventors: Yasuhiro Ogauchi, Higashihiroshima (JP); Shinya Kamada, Kure (JP); Tatsuhiko Iwasaki, Hiroshima (JP); Masaru Nakagishi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 15/037,124

(22) PCT Filed: Nov. 28, 2014

(86) PCT No.: PCT/JP2014/005970
§ 371 (c)(1),
(2) Date: May 17, 2016

(87) PCT Pub. No.: WO2015/092985
PCT Pub. Date: Jun. 25, 2015

(65) Prior Publication Data
US 2016/0290444 A1   Oct. 6, 2016

(30) Foreign Application Priority Data
Dec. 16, 2013  (JP) ................................ 2013-259255

(51) Int. Cl.
*F16H 3/66* (2006.01)

(52) U.S. Cl.
CPC ....... *F16H 3/666* (2013.01); *F16H 2200/006* (2013.01); *F16H 2200/2012* (2013.01); *F16H 2200/2043* (2013.01)

(58) Field of Classification Search
None
See application file for complete search history.

(56) References Cited

U.S. PATENT DOCUMENTS

| 7,753,819 B2 | 7/2010 | Phillips et al. | |
|---|---|---|---|
| 8,591,376 B1 * | 11/2013 | Shim ........................ | F16H 3/66 475/276 |
| 2008/0269005 A1 | 10/2008 | Phillips et al. | |

(Continued)

FOREIGN PATENT DOCUMENTS

| DE | 10 2004 041 506 A1 | 3/2006 |
|---|---|---|
| JP | 2009-281420 A | 12/2009 |

OTHER PUBLICATIONS

International Search Report and Written Opinion issued in Application No. PCT/JP2014/005970, mailed Feb. 24, 2015.

*Primary Examiner* — Justin Holmes
(74) *Attorney, Agent, or Firm* — Studebaker & Brackett PC (57) ABSTRACT

An automatic transmission (1) includes a first planetary gear set (PL1) of a double pinion type, second to fourth planetary gear sets (PL2-PL4) of a single pinion type, first to third clutches (CL1-CL3), and first and second brakes (B1 and B2). A third carrier (C3) and a fourth sun gear (S4) are always coupled to an input (i.e., an input shaft (3)). An output (i.e., an output gear (7)) is always coupled to a fourth ring gear (R4). A first carrier (C1) is always coupled to a third sun gear (S3). A second sun gear (S2) is always coupled to a third ring gear (R3). A first ring gear (R1) is always coupled to a second ring gear (R2).

16 Claims, 3 Drawing Sheets

(56) References Cited

U.S. PATENT DOCUMENTS

| | | |
|---|---|---|
| 2009/0017970 A1 | 1/2009 | Hukill et al. |
| 2009/0048058 A1 | 2/2009 | Carey et al. |
| 2009/0197734 A1* | 8/2009 | Phillips .................... F16H 3/66 475/276 |
| 2009/0264240 A1* | 10/2009 | Carey ...................... F16H 3/66 475/205 |
| 2010/0248890 A1 | 9/2010 | Baldwin |
| 2012/0172172 A1* | 7/2012 | Gumpoltsberger ....... F16H 3/66 475/276 |

* cited by examiner

|  | CL1 | CL2 | CL3 | B1 | B2 | GEAR RATIO | GEAR STEP |
|---|---|---|---|---|---|---|---|
| REVERSE GEAR | ○ | ○ |  | ○ |  | 2.700 |  |
| FIRST GEAR | ○ |  | ○ | ○ |  | 3.893 | ) 1.524 |
| SECOND GEAR | ○ |  |  | ○ | ○ | 2.555 | ) 1.451 |
| THIRD GEAR | ○ |  | ○ |  | ○ | 1.761 | ) 1.286 |
| FOURTH GEAR | ○ | ○ |  |  | ○ | 1.370 | ) 1.370 |
| FIFTH GEAR | ○ | ○ | ○ |  |  | 1.000 | ) 1.271 |
| SIXTH GEAR |  | ○ | ○ |  | ○ | 0.787 | ) 1.154 |
| SEVENTH GEAR |  | ○ | ○ | ○ |  | 0.682 | ) 1.269 |
| EIGHTH GEAR |  | ○ |  | ○ | ○ | 0.538 |  |

FIG.3

AUTOMATIC TRANSMISSION

TECHNICAL FIELD

The present invention relates to an automatic transmission including four planetary gear sets and five frictional engagement elements.

BACKGROUND ART

In recent years, in the field of automatic transmission, there are attempts to design multi-speed automatic transmissions to improve the fuel efficiency. For example, Patent Document 1 discloses an automatic transmission including four planetary gear sets and five frictional engagement elements coaxially with an input shaft to provide eight forward gears and one reverse gear. In this Patent Document 1, a first planetary gear set, a third planetary gear set, a fourth planetary gear set (of a double pinion type), and a second planetary gear set are arranged along the axis of the automatic transmission in this order from one axial end of the automatic transmission. The input shaft is always coupled to a carrier of the first planetary gear set. An output is always coupled to a ring gear of the fourth planetary gear set.

CITATION LIST

Patent Document

[PATENT DOCUMENT 1] U.S. Pat. No. 7,753,819

SUMMARY OF THE INVENTION

Technical Problem

In the Patent Document 1, for example, a coupling member (i.e., interconnecting member) coupling the carrier of the first planetary gear set to the input shaft, a coupling member coupling the ring gear of the fourth planetary gear set to the output, and a coupling member coupling the planetary gear sets pass through the outer or inner circumferential sides of the planetary gear sets. This increases the size of the automatic transmission in a direction perpendicular to the axial direction (i.e., the radial direction). In particular, three coupling members pass through the inner circumferential side of the fourth planetary gear set, in addition to the input shaft. This largely increases the size of the part of the automatic transmission around the fourth planetary gear set in the direction perpendicular to the axial direction. In addition, the output is coupled to the ring gear of the fourth planetary gear set to apply great force to the gears constituting the fourth planetary gear set. It is thus difficult to downsize the gears.

In view of the foregoing, it is an object of the present invention to provide a novel automatic transmission, including four planetary gear sets and five frictional engagement elements, in a reduced size in the direction perpendicular to the axial direction.

Solution to the Problem

In order to achieve this object, the present invention provides an automatic transmission. The automatic transmission includes, in transmission case, an input; an output; a first planetary gear set of a double pinion type including a first sun gear, a first carrier, and a first ring gear; a second planetary gear set of a single pinion type including a second sun gear, a second carrier, and a second ring gear; a third planetary gear set of the single pinion type including a third sun gear, a third carrier, and a third ring gear; a fourth planetary gear set of the single pinion type including a fourth sun gear, a fourth carrier, and a fourth ring gear; a first clutch; a second clutch; a third clutch; a first brake; and a second brake. The input, the output, the first to four planetary gear sets, the first to third clutches, and the first and second brakes are arranged coaxially. The third carrier and the fourth sun gear are always coupled to the input. The output is always coupled to the fourth ring gear. The first carrier is always coupled to the third sun gear. The second sun gear is always coupled to the third ring gear. The first ring gear is always coupled to the second ring gear. The first clutch couples and decouples the second carrier to and from the fourth carrier. The second clutch couples and decouples the second sun gear and the third ring gear to and from the fourth carrier. The third clutch couples and decouples the first carrier and the third sun gear to and from the second carrier. The first brake couples and decouples the first ring gear and the second ring gear to and from the transmission case. The second brake couples and decouples the first sun gear to and from the transmission case.

In this configuration, the fourth sun gear of the fourth planetary gear set is always coupled to the input, and the output is always coupled to the fourth ring gear. Thus, no coupling member passes through the outer or inner circumferential side of the fourth planetary gear set. This configuration reduces an increase in the size of the automatic transmission around the fourth planetary gear set in the direction perpendicular to the axial (i.e., the radial direction) without downsizing the gears constituting the fourth planetary gear set. In addition, the first to fourth planetary gear sets are arranged properly along the axis of the automatic transmission to minimize the number of coupling members that passes through the outer or inner circumferential sides of the planetary gear sets other than the fourth planetary gear set. This results in reduction in the radial size of the automatic transmission.

In the automatic transmission, the first to fourth planetary gear sets may be arranged along an axis of the automatic transmission. Among the first to fourth planetary gear sets, the fourth planetary gear set may be located closest to one axial end of the automatic transmission, and the first planetary gear set may be located closest to another axial end.

In this configuration, no coupling member passes through the outer or inner circumferential side of the fourth planetary gear set, which is closest to the one axial end of the automatic transmission. This reduces the radial size of the automatic transmission at the one end. On the other hand, in the first planetary gear set located closest to the other end, the first ring gear is coupled to the first brake, and the first sun gear is coupled to the second brake. In the axial direction of the automatic transmission, the second brake is arranged at a side of the first planetary gear set opposite to the second planetary gear set. This reduces the radial size of the part of the automatic transmission around the second brake (i.e., at the other end of the automatic transmission). Therefore, the radial size of the automatic transmission is reduced at both the axial ends. While the first brake is usually provided on the outer circumferential side of the first planetary gear set, no coupling member passes through the outer or inner circumferential side of the first planetary gear set. This reduces an increase in the size of the part of the automatic transmission around the first planetary gear set. Furthermore, only one or two coupling member(s) passes/pass through the outer or inner circumferential sides of the second and third planetary gear sets. This reduces an increase in the radial size of an axially intermediate part of the automatic transmission.

In this arrangement, the first to fourth planetary gear sets may be arranged along the axis in an order of the fourth planetary gear set, the third planetary gear set, the second planetary gear set, and the first planetary gear set from the one axial end. The first and second clutches may be arranged between the third and fourth planetary gear sets in an axial direction of the automatic transmission. The third clutch may be arranged between the first and second planetary gear sets in the axial direction.

In this configuration, the first and second clutches are arranged along the radius of the automatic transmission. The transmission case includes an intermediate wall that is adjacent to the first and second clutches and extends radially. Hydraulic oil is easily supplied from the intermediate wall to the first and second clutch. The third clutch is located between the first and second planetary gear sets. A coupling member coupling the first ring gear to the second ring gear exists radially outside the third clutch. An end wall of the transmission case is located on a side of the first planetary gear set opposite to the second planetary gear set. An oil passage passing through the inner circumferential side of the first planetary gear set from the end wall is provided to easily supply hydraulic oil to the third clutch. Therefore, the structures of supplying hydraulic oil to the first to third clutches are simplified.

In this case, the output may be arranged between the first and second clutches and the fourth planetary gear set in the axial direction. The transmission case may include, between the output and the first and second clutches in the axial direction, an intermediate wall extending in a direction perpendicular to the axial direction and supporting the output. Hydraulic oil may be supplied to the first and second clutches via the intermediate wall.

In this configuration, hydraulic oil is easily supplied to the first and second clutches via the intermediate wall supporting the output. This further simplifies the structure of supplying hydraulic oil to the first and second clutch.

Furthermore, the hydraulic oil may be supplied to the third clutch via an end wall of the transmission case at the other axial end, and a though-member penetrating a center of the first planetary gear set from the end wall.

In this manner, the hydraulic oil is easily supplied to the third clutch via the end wall and the though-member.

Alternatively, the first to fourth planetary gear sets may be arranged along the axis in an order of the fourth planetary gear set, the second planetary gear set, the third planetary gear set, and the first planetary gear set from the one axial end. The first and second clutches may be arranged between the second and fourth planetary gear sets in an axial direction of the automatic transmission. The third clutch may be arranged between the first and third planetary gear sets in the axial direction.

This configuration simplifies the structure of supplying hydraulic oil to the first to third clutches like the arrangement of the first to fourth planetary gear sets along the axis in the order of the fourth planetary gear set, the third planetary gear set, the second planetary gear set, and the first planetary gear set from the one axial end.

In this case as well, the output may be arranged between the first and second clutches and the fourth planetary gear set in the axial direction. The transmission case may include, between the output and the first and second clutches in the axial direction, an intermediate wall extending in a direction perpendicular to the axial direction and supporting the output. Hydraulic oil may be supplied to the first and second clutches via the intermediate wall.

The hydraulic oil may be supplied to the third clutch via an end wall of the transmission case at the other axial end, and a though-member penetrating a center of the first planetary gear set from the end wall.

In the automatic transmission, the automatic transmission may provide eight forward gears and one reverse gear. The first clutch, the second clutch, and the first brake may be engaged to provide a reverse gear. The first clutch, the third clutch, and the first brake may be engaged to provide a first gear. The first clutch, the first brake, and the second brake may be engaged to provide a second gear. The first clutch, the third clutch, and the second brake may be engaged to provide a third gear. The first clutch, the second clutch, and the second brake may be engaged to provide a fourth gear. The first clutch, the second clutch and the third clutch may be engaged to provide a fifth gear. The second clutch, the third clutch, and the second brake may be engaged to provide a sixth gear. The second clutch, the third clutch, and the first brake may be engaged to provide a seventh gear. The second clutch, the first brake, and the second brake may be engaged to provide an eighth gear.

In this configuration, the frictional engagement elements are properly engaged to reliably provide eight forward gears and one reverse gear. In respective gear stages, out of the five frictional engagement elements, the number of disengaged frictional engagement elements, which have higher rotational resistance than engaged frictional engagement elements, is smaller than the number of the engaged frictional engagement elements. This allows for efficient power transmission.

Advantages of the Invention

As described above, the automatic transmission according to the present invention reduces an increase in the size of the part of the automatic transmission around the fourth planetary gear set in the direction perpendicular to the axial direction without downsizing the gears constituting the fourth planetary gear set. In addition, the first to fourth planetary gear sets are arranged properly along the axis of the automatic transmission, and the number of coupling members that pass through the outer or inner circumferential sides of the planetary gear sets other than the fourth planetary gear set is reduced as much as possible. This leads to reduction in an increase in the size of the automatic transmission in the direction perpendicular to the axial direction.

DESCRIPTION OF EMBODIMENTS

An embodiment of the present invention will now be described in detail with reference to the drawings.

Figure 1:
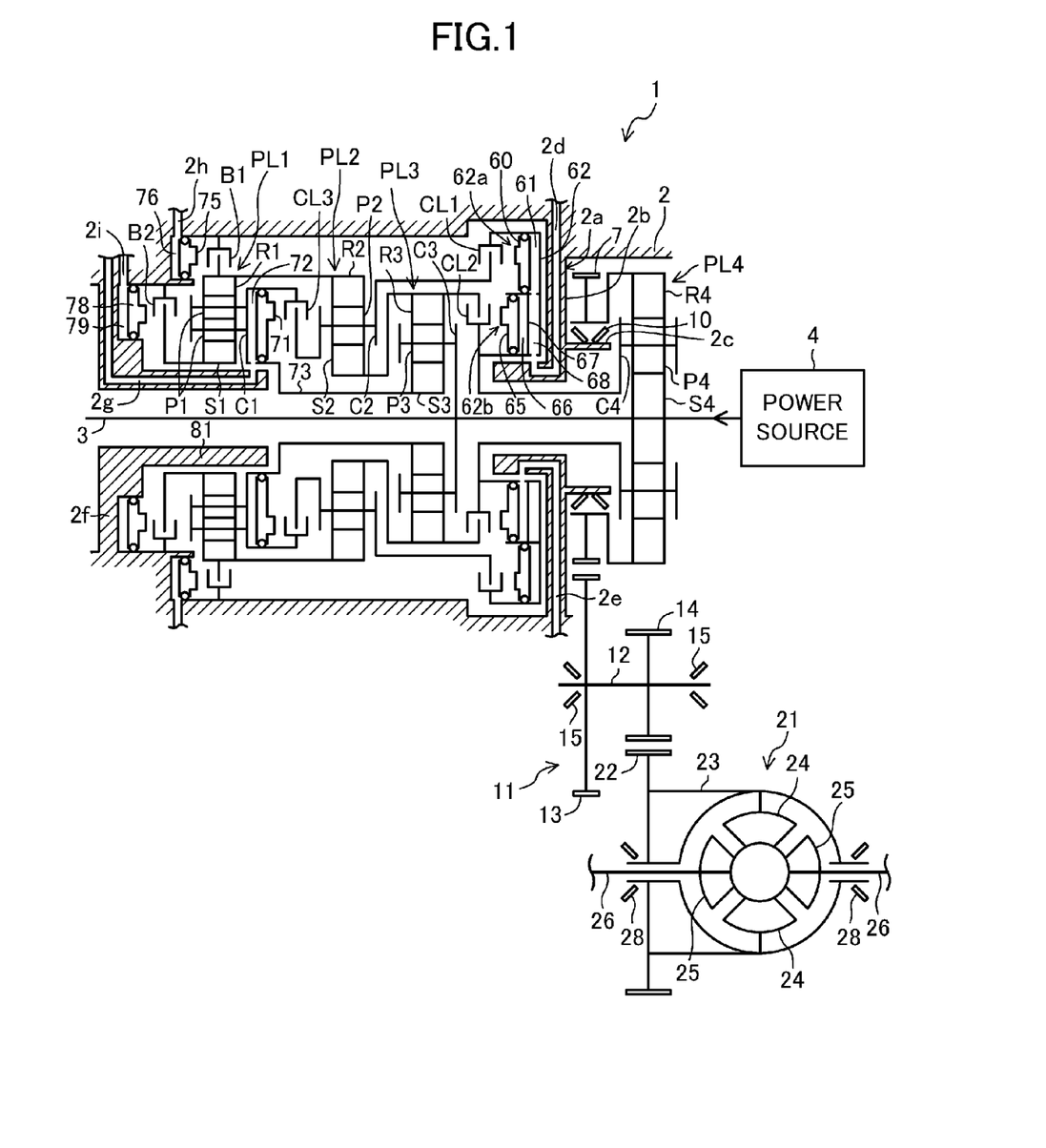
FIG. 1 is a skeleton diagram illustrating an automatic transmission according to an embodiment of the present invention.

FIG. 1 is a skeleton diagram of an automatic transmission 1 according to an embodiment of the present invention. This automatic transmission 1 is mounted in a vehicle and provides eight forward gears and one reverse gear.

The automatic transmission 1 includes in a transmission case 2, an input shaft 3, first to fourth planetary gear sets PL1-PL4, an output gear 7, and five hydraulic frictional engagement elements CL1, CL2, CL3, B1, and B2. The input shaft 3 is an input coupled to a power source 4 (specifically, an output shaft of the power source 4). The output gear 7 is an output to which power input to the input shaft 3 is transmitted via power transmission paths formed by the first to fourth planetary gear sets PL1, PL2, PL3, and PL4. The frictional engagement elements CL1, CL2, CL3, B1, and B2 change the power transmission paths.

The input shaft 3, the first to fourth planetary gear sets PL1, PL2, PL3, and PL4, the output gear 7, and the five frictional engagement elements CL1, CL2, CL3, B1, and B2 are arranged coaxially.

In this embodiment, the input shaft 3 extends through the entire automatic transmission 1 from one axial end (the right of FIG. 1) to the other axial end (the left of FIG. 1). One axial end of the input shaft 3 is coupled to the power source 4. Power is input from the power source 4 to the input shaft 3. Instead of the one axial end, the other axial end of the input shaft 3 may be coupled to the power source 4. Alternatively, two power sources 4 may be provided, and each power source 4 may be coupled to one end of the input shaft 3.

The power source 4 may be an internal combustion engine or an electric motor. The input shaft 3 may be directly coupled to the power source 4, or indirectly coupled via a torque converter or an engaging/disengaging clutch, for example. If each of two power sources 4 is coupled to one end of the input shaft 3, one of the power sources 4 coupled to one end of the input shaft 3 may be an internal combustion engine, and the other power source 4 coupled to the other end may be an electric motor, for example.

In this embodiment, the vehicle is an FF vehicle. The power source 4 and the automatic transmission 1 are mounted at the front of the vehicle. In this state, the output shaft of the power source 4 and the input shaft 3 of the automatic transmission 1 extend horizontally along the width of the vehicle.

The first planetary gear set PL1 is arranged coaxially with the input shaft 3, and includes a first sun gear S1, a first carrier C1, and a first ring gear R1. The first carrier C1 has double pinions P1. That is, the first planetary gear set PL1 is of a double pinion type.

The second planetary gear set PL2 is arranged coaxially with the input shaft 3, and includes a second sun gear S2, a second carrier C2, and a second ring gear R2. The second carrier C2 has single pinions P2. That is, the second planetary gear set PL2 is of a single pinion type.

The third planetary gear set PL3 is arranged coaxially with the input shaft 3, and includes a third sun gear S3, a third carrier C3, and a third ring gear R3. The third carrier C3 has single pinions P3. That is, the third planetary gear set PL3 is also of the single pinion type.

The fourth planetary gear set PL4 is arranged coaxially with the input shaft 3, and includes a fourth sun gear S4, a fourth carrier C4, and a fourth ring gear R4. The fourth carrier C4 has single pinions P4. That is, the fourth planetary gear set PL4 is also of the single pinion type.

Along the input shaft 3 (i.e., along the axis of the automatic transmission 1), the fourth planetary gear set PL4, the third planetary gear set PL3, the second planetary gear set PL2, and the first planetary gear set PL1 are arranged in this order from the one end (closer to the power source 4) of the input shaft 3.

The third carrier C3 and the fourth sun gear S4 are always coupled to the input shaft 3. The first carrier C1 is always coupled to the third sun gear S3. The second sun gear S2 is always coupled to the third ring gear R3. The first ring gear R1 is always coupled to the second ring gear R2. In addition, the output gear 7 is always coupled to the fourth ring gear R4.

The output gear 7, which is always coupled to the fourth ring gear R4, is arranged coaxially with the input shaft 3, and driven by the fourth ring gear R4. The output gear 7 is arranged between the first and second clutches CL1 and CL2 and the fourth planetary gear set PL4 in the input shaft direction. As will described later, the first and second clutches CL1 and CL2 are arranged between the third and fourth planetary gear sets PL3 and PL4 in the input shaft direction.

The fourth sun gear S4 is always coupled to the input shaft 3, and the output gear 7 is always coupled to the fourth ring gear R4. Thus, no coupling member passes through the outer or inner circumferential side of the fourth planetary gear set PL4. Therefore, the transmission case 2 has a smaller outside diameter at the one end, which corresponds to the part around the fourth planetary gear set PL4 and the output gear 7, than an intermediate part in the input shaft direction.

The five frictional engagement elements are comprised of: a first clutch CL1, a second clutch CL2, a third clutch CL3, a first brake B1, and a second brake B2, and are arranged coaxially with the input shaft 3. The first to third clutches CL1-CL3 are multi-plate clutches. The first and second brakes B1 and B2 are, in this embodiment, of a multi-plate clutch type but may also be of a band type.

The first clutch CL1 couples and decouples the second carrier C2 to and from the fourth carrier C4. The second clutch CL2 couples and decouples the second sun gear S2 and the third ring gear R3 to and from the fourth carrier C4. The third clutch CL3 couples and decouples the first carrier C1 and the third sun gear S3 to and from the second carrier C2.

The first and second clutches CL1 and CL2 are arranged between the third and fourth planetary gear sets PL3 and PL4 in the input shaft direction. The second clutch CL2 is located radially inside the first clutch CL1. The third clutch CL3 is arranged between the first and second planetary gear sets PL1 and PL2 in the input shaft direction.

The first brake B1 couples and decouples the first and second ring gears R1 and R2 to and from the transmission case 2. The second brake B2 couples and decouples the first sun gear S1 to and from the transmission case 2.

The first brake B1 is arranged radially outside the first ring gear R1, that is, between the first planetary gear set PL1 (i.e., the first ring gear R1) and the transmission case 2. The second brake B2 is arranged on a side of the first planetary gear set PL1 (at the other end) opposite to the second planetary gear set PL3 in the input shaft direction. The outside diameter of the transmission case 2 at the other end (the part associated with the second brake B2) is as small as that at the one end.

The output gear 7 meshes with a counter input gear 13, which is a counter input of a counter mechanism 11, thereby driving the counter input gear 13. This counter mechanism 11 includes a counter shaft 12, the counter input gear 13, and a counter output gear 14. The counter shaft 12 extends parallel to the input shaft 3. The counter input gear 13 is arranged on the counter shaft 12 and driven by the output gear 7. The counter output gear 14 is a counter output arranged on the counter shaft 12. The counter shaft 12, the counter input gear 13, and the counter output gear 14 rotate integrally. The counter output gear 14 meshes with a differential ring gear 22, which is a differential input of a differential mechanism 21, thereby driving the differential ring gear 22. The counter shaft 12 is located closer to the rear of the vehicle and above the input shaft 3. The counter shaft 12 is rotatably supported by counter bearings (in this embodiment, taper roller bearings) 15 provided at both ends of the counter shaft 12.

The differential mechanism 21 includes a differential case 23 that is fixed to the differential ring gear 22. The differential ring gear 22 and the differential case 23 are supported by differential bearings (in this embodiment, taper roller bearings) 28 rotatably on the central axis of the differential ring gear 22. The central axis of the differential ring gear 22 agrees with the central axes of right and left drive shafts 26, which will be described later.

The differential case 23 includes inside, two differential pinion gears 24, and two differential side gears 25 located coaxially with the differential ring gear 22. Each of the differential pinion gears 24 is fixed to the differential case 23, and meshes with the two differential side gears 25. Each differential pinion gear 24 rotates together with the differential case 23 on the central axis of the differential ring gear 22, and rotates by itself on the central axis of the differential pinion gear 24. When the differential case 23 rotates on the central axis of the differential ring gear 22, each differential pinion gear 24 transmits the rotation to the two differential side gears 25. At this time, if the same load is applied to the two differential side gears 25, the differential pinion gear 24 does not rotate by itself and transmits the rotation of the differential case 23 to the two differential side gears 25 at the same speed. If different loads are applied to the two differential side gears 25, the differential pinion gear 24 rotates by itself to transit differential rotations to the two differential side gears 25.

Each of the two differential side gears 25 is coupled to the right or left drive shaft 26 that is located coaxially with the differential side gears 25. The right and left drive shafts 26 extend along the width of the vehicle (i.e., the direction parallel to the input shaft 3 and the counter shaft 12) and are coupled to the right and left front wheels (not shown). In this manner, the power generated at the output gear 7 is transmitted to the front wheels of the vehicle via the counter mechanism 11 and the differential mechanism 21. The right and left drive shafts 26 are located closer to the rear of the vehicle than the counter shaft 12 and below the counter shaft 12.

The transmission case 2 includes an intermediate wall 2a between the output gear 7 and the first and second clutches CL1 and CL2 in the input shaft direction. The intermediate wall 2a extends in the direction perpendicular to the input shaft (i.e., along the radius of the input shaft 3) and supports the output gear 7. The surface of the intermediate wall 2a facing the fourth planetary gear set PL4 (on the right of FIG. 1) is referred to as a thrust support surface 2b supporting the output gear 7 in the thrust direction (i.e., along the input shaft 3). A projection is formed at a lower part of the thrust support surface 2b of the intermediate wall 2a. The projection projects toward the output gear 7 (i.e., toward the fourth planetary gear set PL4) along the input shaft 3. The radially outside surface of the projection is a radial support surface 2c that radially supports the output gear 7 via bearings 10 (in this embodiment, taper roller bearings). The inner circumferential end of the intermediate wall 2a bends toward the first and second clutches CL1 and CL2, and extends to a position radially inside a second piston 65 of the second clutch CL2, which will be described later.

As simply shown in FIG. 1, the first clutch CL1 includes a first piston 60 slidable along the input shaft, and a first engaging hydraulic chamber 61. The fourth carrier C4 is coupled to the first and second clutches CL1 and CL2 by a coupling member 62. This coupling member 62 bends to include first and second recesses 62a and 62b near the ends of the first and second clutches CL1 and CL2. The first and second recesses 62a and 62b are recessed toward the fourth planetary gear set PL4 in the input shaft direction. The second recess 62b is located radially inside the first recess 62a. The part of the coupling member 62 corresponding to the radially outer wall of the first recess 62a is coupled to the first clutch CL1. The part of the coupling member 62 corresponding to the radially inner wall of the second recess 62b is coupled to the second clutch CL2. The first engaging hydraulic chamber 61 is defined by the first recess 62a and the first piston 60.

The first piston 60 supplies hydraulic oil to the first engaging hydraulic chamber 61 to press and engage clutch plates and friction plates along the input shaft, thereby engaging the first clutch CL1. The clutch plates and friction plates are alternately arranged in the first clutch CL1 along the input shaft. Although not shown, the first clutch CL1 includes a centrifugal balancing hydraulic chamber on the side of the first piston 60 opposite to the engaging hydraulic chamber 61. Specifically, when the first clutch CL1 is disengaged, the centrifugal force moves oil inside the first engaging hydraulic chamber 61 away from the input shaft 3. This moves the first piston 60 toward a position in which the clutch plates and the friction plates are engaged. The oil supplied to the centrifugal balancing hydraulic chamber hinders the movement of the piston 60 due to the centrifugal force (so do the other frictional engagement elements).

The second clutch CL2 includes a second piston 65 and a second engaging hydraulic chamber 66. The second piston 65 is slidable along the input shaft. The second engaging hydraulic chamber 66 is defined by the second recess 62b, a partition member 67, and the second piston 65. The partition member 67 is arranged in the second recess 62b. The part of the second recess 62b on the side of the partition member 67 opposite to the second piston 65 is a hydraulic oil supply passage 68 for the first clutch CL1. This hydraulic oil supply passage 68 couples a hydraulic oil supply passage 2d, which will be described later, to the first engaging hydraulic chamber 61.

The third clutch CL3 includes a third piston 71 and a third engaging hydraulic chamber 72. The third piston 71 is slidable along the input shaft. The third engaging hydraulic chamber 72 is defined by a coupling member 73 coupling the first carrier C1 to the third sun gear S3, and the third piston 71. The coupling member 73 is also coupled to the third clutch CL3.

The first brake B1 includes a fourth piston 75 and a fourth engaging hydraulic chamber 76. The fourth piston 75 is slidable along the input shaft. The fourth engaging hydraulic chamber 76 is defined by the transmission case 2 and the fourth piston 75.

The second brake B2 includes a fifth piston 78 and a fifth engaging hydraulic chamber 79. The fifth piston 78 is slidable along the input shaft. The fifth engaging hydraulic chamber 79 is defined by an end wall 2f of the transmission case 2 on the other end in the input shaft direction, and the fifth piston 78.

Hydraulic oil for controlling the first and second clutches CL1 and CL2 is supplied to the first and second clutches CL1 and CL2 via an intermediate wall 2a. The hydraulic oil supply passage 2d for the first clutch CL1 (i.e., the first engaging hydraulic chamber 61) is provided at a circumferential part of the intermediate wall 2a. The hydraulic oil supply passage 2d is shown in FIG. 1 in the intermediate wall 2a above the input shaft 3. Similarly, a hydraulic oil supply passage 2e for the second clutch CL2 (i.e., the second engaging hydraulic chamber 66) is provided in the intermediate wall 2a in a position circumferentially different from the hydraulic oil supply passage 2d. The hydraulic oil supply passage 2e is shown in FIG. 1 in the intermediate wall 2a below the input shaft 3. These hydraulic oil supply passages 2d and 2e are exposed to the radially outer surface of the bent inner circumferential end of the intermediate wall 2a. Hydraulic oil supply holes are formed in the part of the coupling member 62 corresponding to the radially inner wall of the second recess 62b. One of the hydraulic oil supply holes couples the opening of the hydraulic oil supply passage 2d to the hydraulic oil supply passage 68. The other couples the opening of the hydraulic oil supply passage 2e to the second engaging hydraulic chamber 66. A hydraulic oil supply hole is formed in the part of the coupling member 62 corresponding to the radially outer wall of the second recess 62b, which is also the radially inner wall of the first recess 62a. This hydraulic oil supply hole couples the hydraulic oil supply passage 2d to the hydraulic oil supply passage 68. Sealing members (not shown) are provided near the openings of the hydraulic oil supply passages 2d and 2e between the intermediate wall 2a and the part of the coupling member 62 corresponding to the radially inner wall of the second recess 62b. The structures of supplying hydraulic oil to the centrifugal balancing hydraulic chambers of the first and second clutches CL1 and CL2 are the same as or similar to the structures of supplying hydraulic oil to the first and second engaging hydraulic chambers 61 and 66.

Thus, the hydraulic oil for control is supplied to the first clutch CL1 (i.e., the first engaging hydraulic chamber 61) via the hydraulic oil supply passages 2d and 68. The hydraulic oil for control is supplied to the second clutch CL2 (i.e., the second engaging hydraulic chamber 66) via the hydraulic oil supply passage 2e. In this manner, the hydraulic oil for control is easily supplied the first and second clutches CL1 and CL2 utilizing the intermediate wall 2a, and the structure of supplying hydraulic oil to the first clutch CL1 is simplified.

Hydraulic oil for controlling the third clutch CL3 is supplied to the third clutch CL3 via the end wall 2f of the transmission case 2 and a though-member 81. The though-member 81 penetrates through the center of the first planetary gear set PL2 from the end wall 2f. The though-member 81 is a sleeve-like member through which the input shaft 3 passes, and is located coaxially with the input shaft 3. The though-member 81 is, in this embodiment, integral with the end wall 2f, and projects from the end wall 2f to a position radially inside the third piston 71.

A hydraulic oil supply passage 2g for the third clutch CL3 is provided through the end wall 2f and the though-member 81. The hydraulic oil supply passage 2g is exposed to the outer circumferential surface of the though-member 81 near its projecting tip. A hydraulic oil supply hole is cut in the coupling member 73. This hydraulic oil supply hole couples the opening of the hydraulic oil supply passage 2g to the third engaging hydraulic chamber 72. As a result, the hydraulic oil for control is supplied to the third clutch CL3 (i.e., the third engaging hydraulic chamber 72) via the hydraulic oil supply passage 2g passing through the end wall 2f and the though-member 81. Thus, the structure of supplying hydraulic oil to the third clutch CL3 is also simplified.

Hydraulic oil for controlling the first brake B1 is supplied to the fourth engaging hydraulic chamber 76 of the first brake B1 via a hydraulic oil supply passage 2h in the transmission case 2. Hydraulic oil for controlling the second brake B2 is supplied to the fifth engaging hydraulic chamber 79 of the second brake B2 via the hydraulic oil supply passage 2i in the transmission case 2.

Now, how to change gears of the automatic transmission 1 will be described.

Figure 2:
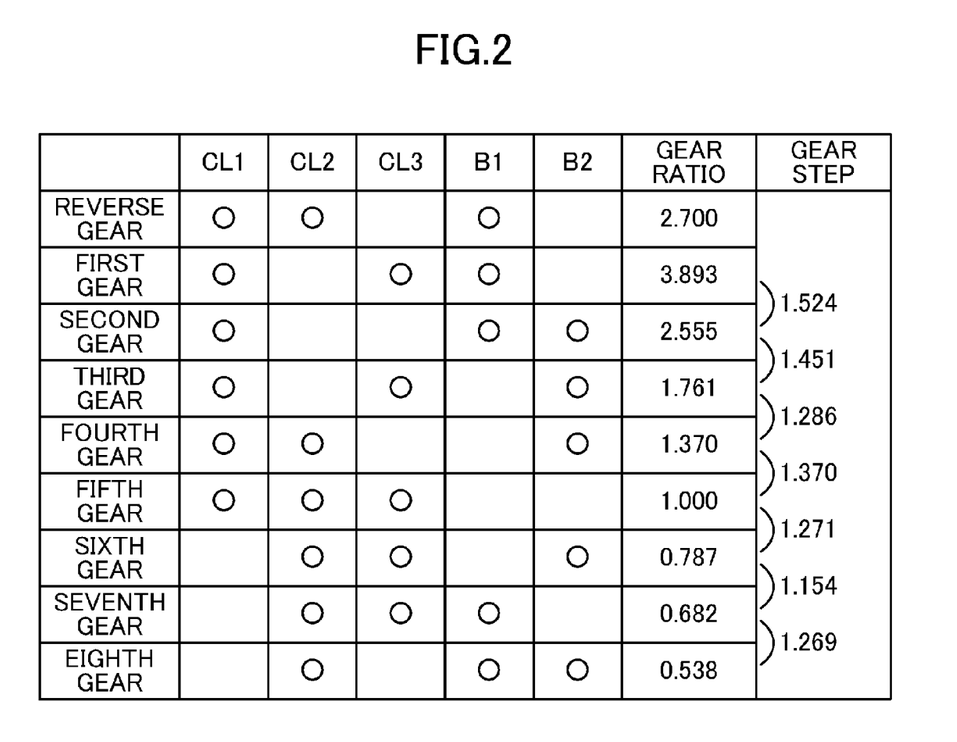
FIG. 2 is a table showing engagement states of first to third clutches and first and second brakes in respective gear stages of the automatic transmission as well as gear ratios in the respective gear stages and gear steps between the gear stages.

FIG. 2 shows engagement states of the first clutch CL1, the second clutch CL2, the third clutch CL3, the first brake B1, and the second brake B2 in each gear stage. The open circles represent engagements, and the blanks represent disengagements.

FIG. 2 also shows gear ratios (i.e., gear reduction ratios) in the respective gear stages, and gear steps between the gear stages, where the number of teeth of the respective gears constituting the first to fourth planetary gear sets PL1-PL4 are set as below. The gear steps are obtained by dividing the gear ratio in the first gear by the gear ratio in the second gear, the gear ratio in the second gear by the gear ratio in the third gear, the gear ratio in the third gear by the gear ratio in the fourth gear, the gear ratio in the fourth gear by the gear ratio in the fifth gear, the gear ratio in the fifth gear by the gear ratio in the sixth gear, the gear ratio in the sixth gear by the gear ratio in the seventh gear, and the gear ratio in the seventh gear by the gear ratio in the eighth gear. In FIG. 2, the transmission ratio range, which is obtained by dividing the gear ratio in the first gear by the gear ratio in the eighth gear, is 7.242.

The numbers of teeth of the constituting gears are as follows:

the first sun gear S1: 42, the first ring gear R1: 108, the double pinion P1: 33, the second sun gear S2: 56, the second ring gear R2: 108, the single pinion P2: 26, the third sun gear S3: 54, the third ring gear R3: 86, the single pinion P3: 16, and the fourth sun gear S4: 40, the fourth ring gear R4: 108, the single pinion P4: 34.

These numbers of the teeth are examples and not limited thereto.

The first clutch CL1, the second clutch CL2, and the first brake B1 are engaged to provide the reverse gear. At this time, the third carrier C3 and the fourth sun gear S4, which are coupled to the input shaft 3, rotate at a rotational speed N0 in the same direction as the input shaft 3, where the rotational speed of the input shaft 3 is N0. Unless otherwise stated, the gears are supposed to rotate in the same direction as the input shaft 3. If the gears rotate in the opposite direction to the input shaft 3, statement will be made.

The first brake B1 is engaged to fix the first and second ring gears R1 and R2 not to rotate the first and second ring gears R1 and R2. The first and second clutches CL1 and CL2 are engaged to rotate the second sun gear S2, the second carrier C2, the third ring gear R3, and the fourth carrier C4 at the same rotational speed. Since the second sun gear S2 and the second carrier C2 rotate at the same rotational speed, the second ring gear R2 also rotates at the same rotational speed. However, since the second ring gear R2 is fixed, the second sun gear S2 and the second carrier C2 are also fixed. As a result, the third ring gear R3 and the fourth carrier C4 are also fixed.

Since the fourth carrier C4 is fixed and the fourth sun gear S4 rotates at N0, the fourth ring gear R4 (i.e., the output gear 7) rotates at a rotational speed lower than N0 in the opposite direction to the input shaft 3.

Since the third ring gear R3 is fixed and the third carrier C3 rotates at N0, the first carrier C1, which is coupled to the third sun gear S3 and the third sun gear S3, rotates at a rotational speed N11 higher than N0. Since the first ring gear R1 is fixed and the first carrier C1 rotates at N11, the first sun gear S1 rotates at a rotational speed higher than N11 in the opposite direction to the input shaft 3.

The first clutch CL1, the third clutch CL3, and the first brake B1 are engaged to provide a first gear. At this time, the third carrier C3 and the fourth sun gear S4, which are coupled to the input shaft 3, rotate at the rotational speed N0.

The first brake B1 is engaged to fix the first and second ring gears R1 and R2 not to rotate the first and second ring gears R1 and R2. The first clutch CL1 and the third clutch CL3 are engaged to rotate the first carrier C1, the second carrier C2, the third sun gear S3, and the fourth carrier C4 at a rotational speed N12 lower than N0, and the second sun gear S2 and the third ring gear R3 at a rotational speed N13 higher than N0.

Since the fourth carrier C4 rotates at N12, and the fourth sun gear S4 rotates at N0, the fourth ring gear R4 (i.e., the output gear 7) rotates at a rotational speed N1 lower than N12.

Since the first ring gear R1 is fixed and the first carrier C1 rotates at N12, the first sun gear S1 rotates in the opposite direction to the input shaft 3.

The first clutch CL1, the first brake B1, and the second brake B2 are engaged to provide a second gear. At this time, the third carrier C3 and the fourth sun gear S4, which are coupled to the input shaft 3, rotate at the rotational speed N0.

The first brake B1 and the second brake B2 are engaged to fix the first sun gear S1, the first and second ring gears R1 and R2 not to rotate the first sun gear S1, the first and second ring gears R1 and R2. Since the first sun gear S1 and the first ring gear R1 are fixed, the first carrier C1 is also fixed to fix the third sun gear S3, which is coupled to the first carrier C1, not to rotate the third sun gear S3.

Since the third sun gear S3 is fixed and the third carrier C3 rotates at N0, the second sun gear S2 coupled to the third ring gear R3 and the third ring gear R3 rotates at a rotational speed N14, which is higher than N0 and N13.

Since the second ring gear R2 is fixed and the second sun gear S2 rotates at N14, the second carrier C2 rotates at a rotational speed N15, which is lower than N14 and higher than N12. The first clutch CL1 is engaged to rotate the fourth carrier C4 at N15.

Since the fourth carrier C4 rotates at N15 and the fourth sun gear S4 rotates at N0, the fourth ring gear R4 (i.e., the output gear 7) rotates at a rotational speed N2, which is lower than N15 and higher than N1.

The first clutch CL1, the third clutch CL3, and the second brake B1 are engaged to provide a third gear. At this time, the third carrier C3 and the fourth sun gear S4, which are coupled to the input shaft 3, rotate at the rotational speed N0.

The second brake B2 is engaged to fix the first sun gear S1 not to rotate the first sun gear S1. The first clutch CL1 and the third clutch CL3 are engaged to rotate the first carrier C1, the second carrier C2, the third sun gear S3, and the fourth carrier C4 at a rotational speed N16, which is lower than N0 and higher than N12; the second sun gear S2 and the third ring gear R3 at a rotational speed N17 higher than N0; and the first carrier C1 and the third sun gear S3 at a rotational speed N18 lower than N16.

Since the fourth carrier C4 rotates at N16 and the fourth sun gear S4 rotates at N0, the fourth ring gear R4 (i.e., the output gear 7) rotates at a rotational speed N3, which is lower than N16 and higher than N2.

The first clutch CL1, the second clutch CL2, and the second brake B2 are engaged to provide a fourth gear. At this time, the third carrier C3 and the fourth sun gear S4, which are coupled to the input shaft 3, rotate at the rotational speed N0.

The second brake B2 is engaged to fix the first sun gear S1 not to rotate the first sun gear S1. The first and second clutches CL1 and CL2 are engaged to rotate the first ring gear R1, the second sun gear S2, the second carrier C2, the second ring gear R2, the third ring gear R3, and the fourth carrier C4 at a rotational speed N19, lower than N0 and higher than N18. The first carrier C1 and the third sun gear S3 rotate at a rotational speed N20, which is higher than N19 and N16.

Since the fourth carrier C4 rotates at N19, and the fourth sun gear S4 rotates at N0, the fourth ring gear R4 (i.e., the output gear 7) rotates at a rotational speed N4, which is lower than N19 and higher than N3.

The first clutch CL1, the second clutch CL2, and the third clutch CL3 are engaged to provide a fifth gear. At this time, the third carrier C3 and the fourth sun gear S4, which are coupled to the input shaft 3, rotate at the rotational speed N0.

The first clutch CL1 and third clutch CL3 are engaged to rotate the first carrier C1, the second carrier C2, the third sun gear S3, and the fourth carrier C4 at the same rotational speed. The third ring gear R3 and the second sun gear S2, which are coupled to the fourth carrier C4 by the engagement of the second clutch CL2, also rotate at the same rotational speed. Since the third sun gear S3 and the third ring gear R3 rotate at the same rotational speed, the third carrier C3 also rotates at the same rotational speed as the third sun gear S3 and the third ring gear R3. As a result, the first carrier C1, the second sun gear S2, the second carrier C2, the third sun gear S3, the third ring gear R3, and the fourth carrier C4 rotate at N0.

Since the second sun gear S2 and the second carrier C2 rotate at N0, the first ring gear R1, which is coupled to the second ring gear R2 and the second ring gear R2, also rotates at N0. Since the first carrier C1 and the first ring gear R1 rotate at N0, the first sun gear S1 also rotates at N0.

Since the fourth sun gear S4 and the fourth carrier C4 rotate at N0, the fourth ring gear R4 (i.e., the output gear 7) rotates at a rotational speed N5, which is equal to N0 and higher than N4.

The second clutch CL2, the third clutch CL3, and the second brake B2 are engaged to provide a sixth gear. At this time, the third carrier C3 and the fourth sun gear S4, which are coupled to the input shaft 3, rotate at the rotational speed N0.

The second brake B2 is engaged to fix the first sun gear S1 not to rotate the first sun gear S1. The second clutch CL2 and the third clutch CL3 are engaged to rotate the second sun gear S2, the third ring gear R3, and the fourth carrier C4 at a rotational speed N21 higher than N0; the first carrier C1, the second carrier C2, and the third sun gear S3 at a rotational speed N22 lower than N0; and the first and second ring gears R1 and R2 at a rotational speed N23 lower than N22.

Since the fourth carrier C4 rotates at N21, and the fourth sun gear S4 rotates at N0, the fourth ring gear R4 (i.e., the output gear 7) rotates at a rotational speed N6, which is higher than N21 and N5.

The second clutch CL2, the third clutch CL3, and the first brake B1 are engaged to provide a seventh gear. At this time, the third carrier C3 and the fourth sun gear S4, which are coupled to the input shaft 3, rotate at the rotational speed N0.

The first brake B1 is engaged to fix the first and second ring gears R1 and R2 not to rotate the first and second ring gears R1 and R2. The second clutch CL2 and the third clutch CL3 are engaged to rotate the first carrier C1, the second carrier C2, and the third sun gear S3 at a rotational speed N24 lower than N0; and the second sun gear S2, the third ring gear R3, and the fourth carrier C4 at a rotational speed N25, which is higher than N0 and N21.

Since the fourth carrier C4 rotates at N25, and the fourth sun gear S4 rotates at N0, the fourth ring gear R4 (i.e., the output gear 7) rotates at a rotational speed N7 higher than N25 and N6.

The second clutch CL2, the first brake B1, and the second brake B2 are engaged to provide an eighth gear. At this time, the third carrier C3 and the fourth sun gear S4, which are coupled to the input shaft 3, rotate at the rotational speed N0.

The first brake B1 and second brake B2 are engaged to fix the first ring gear R1, the first sun gear S1, and the second ring gear R2 not to rotate the first ring gear R1, the first sun gear S1, and the second ring gear R2. Since the first ring gear R1 and the first sun gear S1 are fixed, the first carrier C1 is also fixed to fix the third sun gear S3, which is coupled to the first carrier C1, not to rotate the third sun gear S3.

Since the third sun gear S3 is fixed and the third carrier C3 rotates at N0, the second sun gear S2 coupled to the third ring gear R3 and the third ring gear R3 rotate at a rotational speed N14 higher than N0. The first clutch CL1 is engaged to rotate the fourth carrier C4 at N14 higher than N25.

Since the fourth carrier C4 rotates at N14 and the fourth sun gear S4 rotates at N0, the fourth ring gear R4 (i.e., the output gear 7) rotates at a rotational speed N8, which is higher than N14 and N7.

Since the second sun gear S2 rotates at the same rotational speed N14 as the third ring gear R3, and the second ring gear R is fixed, the second carrier C2 rotates at a rotational speed lower than N14.

In this embodiment, among the first to fourth planetary gear sets PL1, PL2, PL3, and PL4, the fourth sun gear S4 of the fourth planetary gear set PL4, which is located closest to the one end (closer to the power source 4) of the automatic transmission 1 in the input shaft direction, is always coupled to the input shaft 3, and the output gear 7 is always coupled to the fourth ring gear R4. Thus, no coupling member passes through the outer or inner circumferential side of the fourth planetary gear set PL4. Only the input shaft 3 passes through the inner circumferential side of the fourth planetary gear set PL4. This reduces the radial size of the part of the automatic transmission 1 around the fourth planetary gear set PL4 (i.e., the one end of the automatic transmission 1 (or the transmission case 2)) without downsizing the gears constituting the fourth planetary gear set PL4.

In the first planetary gear set PL1 located closest to the other end of the automatic transmission 1 in the input shaft direction, the first ring gear R1 is coupled to the first brake B1, and the first sun gear S1 is coupled to the second brake B2. Thus, in the input shaft direction, the second brake B2 is arranged on the side of the first planetary gear set PL1 opposite to the second planetary gear set PL2. This reduces the radial size of the part of the automatic transmission 1 around the second brake B2 (i.e., the other end of the automatic transmission 1 (or the transmission case 2).

In addition, the though-member 81 penetrates through the inner circumferential side of the first planetary gear set PL1, and the first brake B1 exists on the outer circumferential side. However, no coupling member passes through the outer or inner circumferential side of the first planetary gear set PL1. This reduces an increase in the size of the part of the automatic transmission 1 around the first planetary gear set PL1.

The coupling member coupling the first carrier C1 and the third clutch CL3 to the third sun gear S3 is the only coupling member passing through the inner circumferential side of the second planetary gear set PL2. No coupling member passes through the outer circumferential side of the second planetary gear set PL2. The coupling member coupling the second carrier C2 to the first clutch CL1 is the only coupling member passing through the outer circumferential side of the third planetary gear set PL3. No coupling member passes through the inner circumferential side of the third planetary gear set PL3. Only the input shaft 3 passes through the inner circumferential side of the third planetary gear set PL3. This reduces an increase in the radial size of the automatic transmission 1 at an intermediate part of in the input shaft direction. This results in reduction in the radial size of the automatic transmission 1.

The present invention is not limited to the embodiments described above, and may be modified within the scope of the claims.

Figure 3:
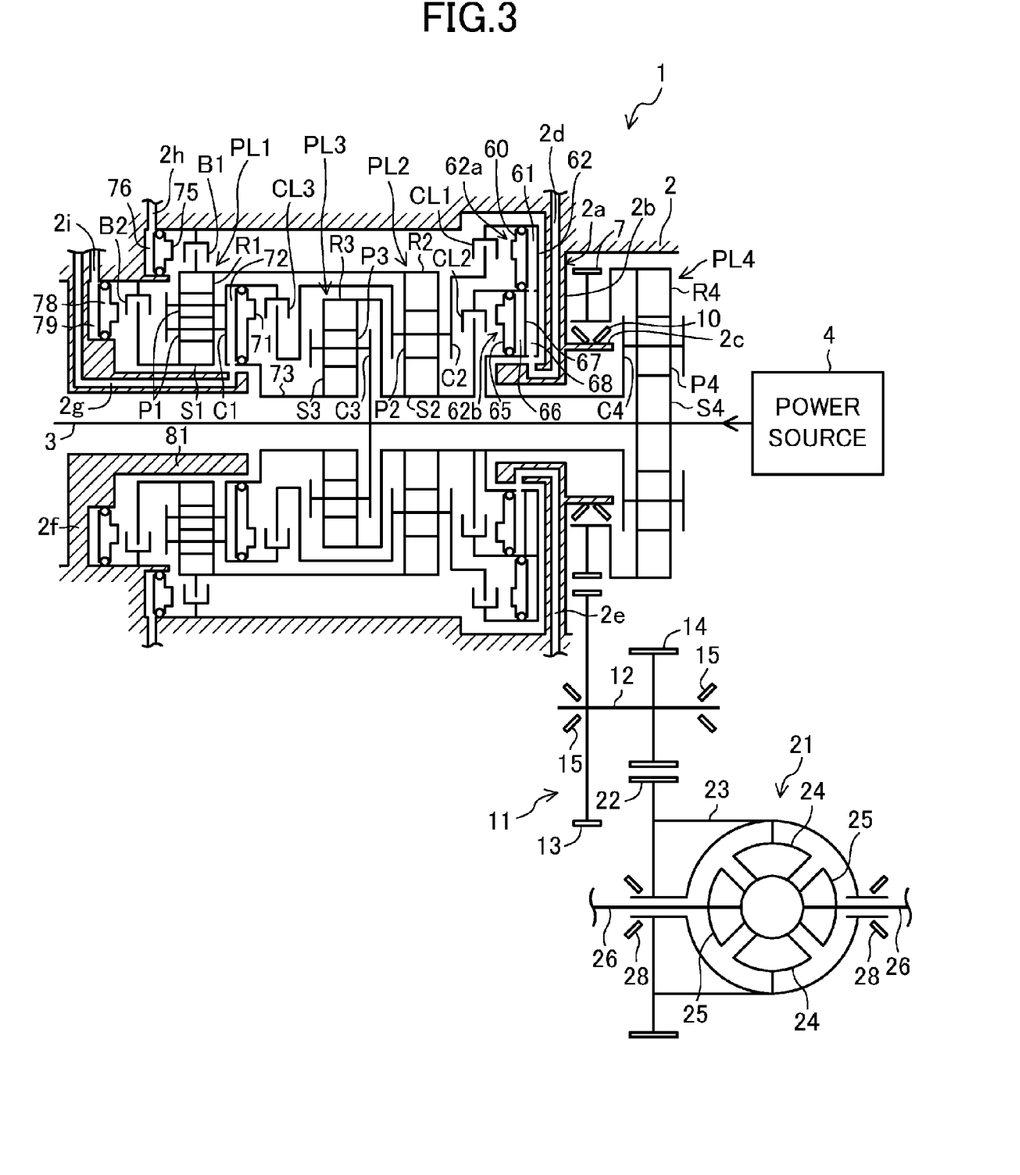
FIG. 3 illustrates a variation of the embodiment and corresponds to FIG. 1.

For example, in the embodiment described above, the first to fourth planetary gear sets PL1, PL2, PL3, and PL4 are arranged along the input shaft in the order of the fourth planetary gear set PL4, the third planetary gear set PL3, the second planetary gear set PL2, and the first planetary gear set PL1 from the one end of the input shaft. As shown in FIG. 3, the first to fourth planetary gear sets PL1, PL2, PL3, and PL4 may be arranged along the input shaft in the order of the fourth planetary gear set PL4, the second planetary gear set PL2, the third planetary gear set PL3, and the first planetary gear set PL1 from the one end of the input shaft. In this case, the first and second clutches CL1 and CL2 are arranged between the second and fourth planetary gear sets PL2 and PL4 in the input shaft direction. The third clutch CL3 is arranged between the first planetary gear set PL1 and the third planetary gear set PL3 in the input shaft direction. Similar to the embodiment described above, the output gear 7 is arranged between the first and second clutches CL1 and CL2 and the fourth planetary gear set PL4 in the input shaft direction. The intermediate wall 2a supporting the output gear 7 is arranged between the output gear 7 and the first and second clutches CL1 and CL2 in the input shaft direction. The hydraulic oil is supplied to the first and second clutches CL1 and CL2 via the intermediate wall 2a. Similar to the embodiment described above, the hydraulic oil is supplied to the third clutch CL3 via an end wall 2f of the transmission case 2 at the other end, and the though-member (sleeve-like member) 81 penetrating through the center of the first planetary gear set PL1 from the end wall 2f. The other configurations are similar to those in the embodiment described above.

While the automatic transmission 1 is mounted in the FF vehicle in this embodiment, it may be mounted in an FR vehicle such that an input shaft 3 extends along the length of the vehicle. A power source 4 is coupled to the other end of the input shaft 3, which is the front of the vehicle. The first to fourth planetary gear sets PL1, PL2, PL3, and PL4 are arranged as shown in FIG. 1 or 3. Among them, the fourth planetary gear set PL4 is located closest to the rear of the vehicle. Unlike the embodiment, no output gear 7 or no counter mechanism 11 may be provided. The output shaft, which is the output coupled to the fourth ring gear R4 of the fourth planetary gear set PL4 closest to the rear of the vehicle, is provided coaxially with the input shaft 3. This output shaft extends horizontally along the automatic transmission 1 toward the rear end of the vehicle and is coupled to a propeller shaft (not shown).

The embodiments described above are mere examples and are not intended to be construed as limiting the scope of the present invention. The scope of the present invention is defined by the claims. All variations and modifications of the claims and equivalents fall within the scope of the present invention.

INDUSTRIAL APPLICABILITY

The present invention is useful as an automatic transmission that coaxially includes, in a transmission case, an input, an output, four planetary gear sets, and five frictional engagement elements. The present invention is particularly useful as an automatic transmission that provides eight forward gears and one reverse gear.

DESCRIPTION OF REFERENCE CHARACTERS

1 Automatic Transmission
2a Intermediate Wall
2f Other End Wall
3 Input Shaft (Input)
7 Output Gear (Output)
81 Though-Member
PL1 First Planetary Gear Set
PL2 Second Planetary Gear Set
PL3 Third Planetary Gear Set
PL4 Fourth Planetary Gear Set
S1 First Sun Gear
S2 Second Sun Gear
S3 Third Sun Gear
S4 Fourth Sun Gear
C1 First Carrier
C2 Second Carrier
C3 Third Carrier
C4 Fourth Carrier
R1 First Ring Gear
R2 Second Ring Gear
R3 Third Ring Gear
R4 Fourth Ring Gear
CL1 First Clutch (Frictional Engagement Element)
CL2 Second Clutch (Frictional Engagement Element)
CL3 Third Clutch (Frictional Engagement Element)
B1 First Brake (Frictional Engagement Element)
B2 Second Brake (Frictional Engagement Element)

The invention claimed is:

1. An automatic transmission comprising, in a transmission case:
   an input;
   an output;
   a first planetary gear set of a double pinion type including a first sun gear, a first carrier, and a first ring gear;
   a second planetary gear set of a single pinion type including a second sun gear, a second carrier, and a second ring gear;
   a third planetary gear set of the single pinion type including a third sun gear, a third carrier, and a third ring gear;
   a fourth planetary gear set of the single pinion type including a fourth sun gear, a fourth carrier, and a fourth ring gear;
   a first clutch;
   a second clutch;
   a third clutch;
   a first brake; and
   a second brake, wherein
   the input, the output, the first to four planetary gear sets, the first to third clutches, and the first and second brakes are arranged coaxially,
   the third carrier and the fourth sun gear are always coupled to the input,
   the output is always coupled to the fourth ring gear,
   the first carrier is always coupled to the third sun gear,
   the second sun gear is always coupled to the third ring gear,
   the first ring gear is always coupled to the second ring gear,
   the first clutch couples and decouples the second carrier to and from the fourth carrier,
   the second clutch couples and decouples the second sun gear and the third ring gear to and from the fourth carrier,
   the third clutch couples and decouples the first carrier and the third sun gear to and from the second carrier,
   the first brake couples and decouples the first ring gear and the second ring gear to and from the transmission case, and
   the second brake couples and decouples the first sun gear to and from the transmission case.

2. The automatic transmission of claim 1, wherein
   the first to fourth planetary gear sets are arranged along an axis of the automatic transmission, and
   among the first to fourth planetary gear sets, the fourth planetary gear set is located closest to one axial end of the automatic transmission, and the first planetary gear set is located closest to another axial end.

3. The automatic transmission of claim 2, wherein
   the first to fourth planetary gear sets are arranged along the axis in an order of the fourth planetary gear set, the third planetary gear set, the second planetary gear set, and the first planetary gear set from the one axial end,
   the first and second clutches are arranged between the third and fourth planetary gear sets in an axial direction of the automatic transmission, and
   the third clutch is arranged between the first and second planetary gear sets in the axial direction.

4. The automatic transmission of claim 3, wherein
   the output is arranged between the first and second clutches and the fourth planetary gear set in the axial direction,
   the transmission case includes, between the output and the first and second clutches in the axial direction, an intermediate wall extending in a direction perpendicular to the axial direction and supporting the output, and
   hydraulic oil is supplied to the first and second clutches via the intermediate wall.

5. The automatic transmission of claim 4, wherein
   the hydraulic oil is supplied to the third clutch via an end wall of the transmission case at the other axial end, and
   a though-member penetrating a center of the first planetary gear set from the end wall.

6. The automatic transmission of claim 2, wherein
   the first to fourth planetary gear sets are arranged along the axis in an order of the fourth planetary gear set, the second planetary gear set, the third planetary gear set, and the first planetary gear set from the one axial end,
   the first and second clutches are arranged between the second and fourth planetary gear sets in an axial direction of the automatic transmission, and the third clutch is arranged between the first and third planetary gear sets in the axial direction.

7. The automatic transmission of claim 6, wherein
the output is arranged between the first and second clutches and the fourth planetary gear set in the axial direction,
the transmission case includes, between the output and the first and second clutches in the axial direction, an intermediate wall extending in a direction perpendicular to the axial direction and supporting the output, and
hydraulic oil is supplied to the first and second clutches via the intermediate wall.

8. The automatic transmission of claim 7, wherein
the hydraulic oil is supplied to the third clutch via an end wall of the transmission case at the other axial end, and a though-member penetrating a center of the first planetary gear set from the end wall.

9. The automatic transmission of claim 1, wherein
the automatic transmission provides eight forward gears and one reverse gear,
the first clutch, the second clutch, and the first brake are engaged to provide a reverse gear,
the first clutch, the third clutch, and the first brake are engaged to provide a first gear,
the first clutch, the first brake, and the second brake are engaged to provide a second gear,
the first clutch, the third clutch, and the second brake are engaged to provide a third gear,
the first clutch, the second clutch, and the second brake are engaged to provide a fourth gear,
the first clutch, the second clutch and the third clutch are engaged to provide a fifth gear,
the second clutch, the third clutch, and the second brake are engaged to provide a sixth gear,
the second clutch, the third clutch, and the first brake are engaged to provide a seventh gear, and
the second clutch, the first brake, and the second brake are engaged to provide an eighth gear.

10. The automatic transmission of claim 2, wherein
the automatic transmission provides eight forward gears and one reverse gear,
the first clutch, the second clutch, and the first brake are engaged to provide a reverse gear,
the first clutch, the third clutch, and the first brake are engaged to provide a first gear,
the first clutch, the first brake, and the second brake are engaged to provide a second gear,
the first clutch, the third clutch, and the second brake are engaged to provide a third gear,
the first clutch, the second clutch, and the second brake are engaged to provide a fourth gear,
the first clutch, the second clutch and the third clutch are engaged to provide a fifth gear,
the second clutch, the third clutch, and the second brake are engaged to provide a sixth gear,
the second clutch, the third clutch, and the first brake are engaged to provide a seventh gear, and
the second clutch, the first brake, and the second brake are engaged to provide an eighth gear.

11. The automatic transmission of claim 3, wherein
the automatic transmission provides eight forward gears and one reverse gear,
the first clutch, the second clutch, and the first brake are engaged to provide a reverse gear,
the first clutch, the third clutch, and the first brake are engaged to provide a first gear,
the first clutch, the first brake, and the second brake are engaged to provide a second gear,
the first clutch, the third clutch, and the second brake are engaged to provide a third gear,
the first clutch, the second clutch, and the second brake are engaged to provide a fourth gear,
the first clutch, the second clutch and the third clutch are engaged to provide a fifth gear,
the second clutch, the third clutch, and the second brake are engaged to provide a sixth gear,
the second clutch, the third clutch, and the first brake are engaged to provide a seventh gear, and
the second clutch, the first brake, and the second brake are engaged to provide an eighth gear.

12. The automatic transmission of claim 4, wherein
the automatic transmission provides eight forward gears and one reverse gear,
the first clutch, the second clutch, and the first brake are engaged to provide a reverse gear,
the first clutch, the third clutch, and the first brake are engaged to provide a first gear,
the first clutch, the first brake, and the second brake are engaged to provide a second gear,
the first clutch, the third clutch, and the second brake are engaged to provide a third gear,
the first clutch, the second clutch, and the second brake are engaged to provide a fourth gear,
the first clutch, the second clutch and the third clutch are engaged to provide a fifth gear,
the second clutch, the third clutch, and the second brake are engaged to provide a sixth gear,
the second clutch, the third clutch, and the first brake are engaged to provide a seventh gear, and
the second clutch, the first brake, and the second brake are engaged to provide an eighth gear.

13. The automatic transmission of claim 5, wherein
the automatic transmission provides eight forward gears and one reverse gear,
the first clutch, the second clutch, and the first brake are engaged to provide a reverse gear,
the first clutch, the third clutch, and the first brake are engaged to provide a first gear,
the first clutch, the first brake, and the second brake are engaged to provide a second gear,
the first clutch, the third clutch, and the second brake are engaged to provide a third gear,
the first clutch, the second clutch, and the second brake are engaged to provide a fourth gear,
the first clutch, the second clutch and the third clutch are engaged to provide a fifth gear,
the second clutch, the third clutch, and the second brake are engaged to provide a sixth gear,
the second clutch, the third clutch, and the first brake are engaged to provide a seventh gear, and
the second clutch, the first brake, and the second brake are engaged to provide an eighth gear.

14. The automatic transmission of claim 6, wherein
the automatic transmission provides eight forward gears and one reverse gear,
the first clutch, the second clutch, and the first brake are engaged to provide a reverse gear,
the first clutch, the third clutch, and the first brake are engaged to provide a first gear,
the first clutch, the first brake, and the second brake are engaged to provide a second gear,
the first clutch, the third clutch, and the second brake are engaged to provide a third gear, the first clutch, the second clutch, and the second brake are engaged to provide a fourth gear, the first clutch, the second clutch and the third clutch are engaged to provide a fifth gear, the second clutch, the third clutch, and the second brake are engaged to provide a sixth gear, the second clutch, the third clutch, and the first brake are engaged to provide a seventh gear, and the second clutch, the first brake, and the second brake are engaged to provide an eighth gear.

15. The automatic transmission of claim 7, wherein the automatic transmission provides eight forward gears and one reverse gear, the first clutch, the second clutch, and the first brake are engaged to provide a reverse gear, the first clutch, the third clutch, and the first brake are engaged to provide a first gear, the first clutch, the first brake, and the second brake are engaged to provide a second gear, the first clutch, the third clutch, and the second brake are engaged to provide a third gear, the first clutch, the second clutch, and the second brake are engaged to provide a fourth gear, the first clutch, the second clutch and the third clutch are engaged to provide a fifth gear, the second clutch, the third clutch, and the second brake are engaged to provide a sixth gear, the second clutch, the third clutch, and the first brake are engaged to provide a seventh gear, and the second clutch, the first brake, and the second brake are engaged to provide an eighth gear.

16. The automatic transmission of claim 8, wherein the automatic transmission provides eight forward gears and one reverse gear, the first clutch, the second clutch, and the first brake are engaged to provide a reverse gear, the first clutch, the third clutch, and the first brake are engaged to provide a first gear, the first clutch, the first brake, and the second brake are engaged to provide a second gear, the first clutch, the third clutch, and the second brake are engaged to provide a third gear, the first clutch, the second clutch, and the second brake are engaged to provide a fourth gear, the first clutch, the second clutch and the third clutch are engaged to provide a fifth gear, the second clutch, the third clutch, and the second brake are engaged to provide a sixth gear, the second clutch, the third clutch, and the first brake are engaged to provide a seventh gear, and the second clutch, the first brake, and the second brake are engaged to provide an eighth gear.

* * * * *